United States Patent
Biagini

(10) Patent No.: US 9,821,670 B2
(45) Date of Patent: Nov. 21, 2017

(54) VEHICLE BATTERY EXTERNAL LOADING DEVICE INCLUDING AN AC/DC CONVERTER HAVING A RESONANT INSULATED STAGE

(71) Applicant: INTELLIGENT ELECTRONIC SYSTEMS, Saint-Aunes (FR)

(72) Inventor: Eric Biagini, Perols (FR)

(73) Assignee: INTELLIGENT ELECTRONIC SYSTEMS, Montpellier (FR)

( * ) Notice: Subject to any disclaimer, the term of this patent is extended or adjusted under 35 U.S.C. 154(b) by 415 days.

(21) Appl. No.: 14/382,526

(22) PCT Filed: Mar. 7, 2013

(86) PCT No.: PCT/EP2013/054633
§ 371 (c)(1),
(2) Date: Sep. 2, 2014

(87) PCT Pub. No.: WO2013/132020
PCT Pub. Date: Sep. 12, 2013

(65) Prior Publication Data
US 2015/0097528 A1 Apr. 9, 2015

(30) Foreign Application Priority Data
Mar. 9, 2012 (FR) .................... 12 00728

(51) Int. Cl.
*H02J 7/00* (2006.01)
*B60L 11/18* (2006.01)
(Continued)

(52) U.S. Cl.
CPC ....... *B60L 11/1812* (2013.01); *B60L 11/1816* (2013.01); *H02J 7/0052* (2013.01);
(Continued)

(58) Field of Classification Search
USPC ......................................... 320/109
See application file for complete search history.

(56) References Cited

U.S. PATENT DOCUMENTS

2007/0086222 A1 4/2007 Iida
2012/0032633 A1 2/2012 Cordes et al.
(Continued)

FOREIGN PATENT DOCUMENTS

CN 101494413 7/2009
EP 2081285 7/2009
(Continued)

OTHER PUBLICATIONS

Kim, et al., "Design and Implementation of a High-Efficiency On-Board Battery Charger for Electric Vehicles with Frequency Control Strategy", IEEE Xplore Conference: Vehicle Power and Propulsion Conference (VPPC), Oct., 2010.
(Continued)

*Primary Examiner* — Robert Grant
(74) *Attorney, Agent, or Firm* — Duane Morris LLP; Gregory M. Lefkowitz; Jason M. Nolan

(57) ABSTRACT

The invention relates to a device (2) for charging a motor-driven device battery (5). Said charging device (2) includes: a first conversion module (3); a second conversion module (4); and a means (6) for controlling the first conversion module (3). The first conversion module (3) is suitable for converting an input AC current into an intermediate current and supplying said intermediate current to the second conversion module (4). The second conversion module (4) is suitable for converting the intermediate current into an output current and supplying said output current to the battery (5). The intermediate current is direct current, and the output current is also direct current. The controlling means (6) is suitable for adjusting the voltage of the inter-
(Continued)

mediate current on the basis of operating parameters of the second conversion module (3).

22 Claims, 3 Drawing Sheets

(51) Int. Cl.
*H02M 3/338* (2006.01)
*H02J 7/10* (2006.01)
*H02M 1/42* (2007.01)
*H02J 7/02* (2016.01)
*H02M 1/00* (2006.01)

(52) U.S. Cl.
CPC ......... *H02J 7/0072* (2013.01); *H02M 1/4225* (2013.01); *H02M 3/3382* (2013.01); *H02M 3/3387* (2013.01); *B60L 2200/42* (2013.01); *B60L 2200/44* (2013.01); *B60L 2210/10* (2013.01); *B60L 2210/30* (2013.01); *H02J 7/022* (2013.01); *H02J 7/10* (2013.01); *H02M 1/4208* (2013.01); *H02M 2001/007* (2013.01); *H02M 2001/0048* (2013.01); *Y02P 90/60* (2015.11); *Y02T 10/7005* (2013.01); *Y02T 10/7072* (2013.01); *Y02T 10/7216* (2013.01); *Y02T 10/7241* (2013.01); *Y02T 10/92* (2013.01); *Y02T 90/127* (2013.01); *Y02T 90/14* (2013.01)

(56) References Cited

U.S. PATENT DOCUMENTS

2012/0049794 A1* 3/2012 Han .................. B60L 1/003
                                                    320/109
2012/0235626 A1* 9/2012 Oh .................. H02J 7/0022
                                                    320/103

FOREIGN PATENT DOCUMENTS

FR          2947114        12/2010
JP          2011234527     11/2011

OTHER PUBLICATIONS

Cox, "A Universal Power Converter for Emergency Charging of Electric Vehicle Batteries", IEEE, pp. 965-969, (1995).

Musavi, et al., "Practical Design Considerations for a LLC Multi-Resonant DC-DC Converter in Battery Charging Applications", IEEE, pp. 2596-2602 (2012).

* cited by examiner

VEHICLE BATTERY EXTERNAL LOADING DEVICE INCLUDING AN AC/DC CONVERTER HAVING A RESONANT INSULATED STAGE

CROSS-REFERENCE TO RELATED APPLICATIONS

This application is a §371 national stage entry of International Application No. PCT/EP2013/054633, filed Mar. 7, 2013, which claims priority to French Patent Application No. 12/00728, filed Mar. 9, 2012, the entire contents of which are incorporated herein by reference.

FIELD OF THE INVENTION

The present invention relates to a charging device comprising an isolated AC-DC converter, with this charging device being particularly suitable for use as a device on board an electric motor vehicle or as a device external to the electric motor vehicle.

TECHNICAL BACKGROUND

Numerous movable craft use electrical energy and are equipped with batteries, for example electric vehicles, work platforms, pallet trucks, etc. These craft generally comprise on-board chargers, i.e. electric battery chargers that are directly mounted on the movable craft. They can also be used with an external battery charging device.

The main function of these chargers is to recharge batteries from the electricity available on the electricity distribution network. They therefore convert an alternating current into a direct current.

The required criteria for the chargers, and more particularly for on-board chargers, are high output, low spatial requirement, galvanic isolation, good reliability, operating safety, low emission of electromagnetic interference and a low rate of harmonics on the input current.

In order to implement the AC-DC conversion function with galvanic isolation, the use of a structure with two converters is known:
  a first AC-DC converter, referred to as pre-regulator, which comprises a power factor correction circuit in order to limit the input current harmonics;
  a second DC-DC converter for regulating the charge. This DC-DC converter also provides the galvanic isolation function for operating safety.

The first converter generally delivers a constant output voltage and the second converter regulates the voltage and the output current that supply the battery.

Such a system is satisfactory for certain applications such as the power supply for low-power devices (plasma screen or LCD screen television sets, for example). Within the context of the power supply for batteries of motorised devices of the electric motor vehicle type, where the delivered power is significantly higher, the charging device must adapt to the significant variability in the voltage and in the output current supplying the battery.

Due to this variability in the output conditions, the DC-DC converter is used over a wide range of conditions, and particularly in sub-optimal conditions, where the performance of the system is degraded. Such degradation is particularly damaging given the high power that is used.

A requirement therefore exists for improving the performance of charging devices designed to supply batteries of motorised devices, and electric motor vehicles in particular.

SUMMARY OF THE INVENTION

The invention firstly relates to a charging device for a battery of a motorised device, said charging device comprising:
  a first conversion module;
  a second conversion module;
  means for controlling the first conversion module;
  the first conversion module being adapted to convert an input alternating current into an intermediate current and to supply the second conversion module with said intermediate current;
  the second conversion module being adapted to convert the intermediate current into an output current and to supply the battery with said output current;
  the intermediate current being a direct current and the output current also being a direct current;
  the control means being adapted to adjust the voltage of the intermediate current as a function of operating parameters of said second conversion module.

According to one embodiment, the control means are adapted to adjust the voltage of the intermediate current as a function of the voltage and/or of the power and/or of the intensity of the output current.

According to one embodiment, the second conversion module is a switching conversion module comprising galvanic isolation, operating at a switching frequency, which preferably is variable, and preferably the control means are adapted to adjust the voltage of the intermediate current as a function of said switching frequency.

According to one embodiment, the second conversion module comprises a resonant circuit having at least one resonance frequency.

According to one embodiment, the second conversion module comprises a switching sub-module, associated with the resonant circuit, adapted to convert the intermediate current into a first alternating current with a switching frequency; a transformation sub-module adapted to convert the first alternating current into a second alternating current; a rectification sub-module adapted to convert the second alternating current into the output current.

According to one embodiment, the resonant circuit is a circuit of the LC type or of the LLC type comprising at least one capacitor and at least one inductor.

According to one embodiment, the control means are adapted to adjust the voltage of the intermediate current so that the switching frequency can be adjusted to a setpoint value.

According to one embodiment, the setpoint value of the switching frequency is equal to the resonance frequency or is greater than the resonance frequency, and preferably equals 1.05 to 1.80 times the resonance frequency, and in a more particularly preferred manner equals 1.10 to 1.50 times the resonance frequency.

According to one embodiment, the first conversion module comprises a power factor correction circuit.

According to one embodiment, the first conversion module comprises a device for measuring the voltage of the intermediate current, as well as means for adjusting said voltage to a setpoint voltage; and the control means are adapted to modulate the means for measuring the voltage of the intermediate current.

According to one embodiment, the control means comprise a digital controller of the first conversion module.

According to one embodiment, the device is adapted to operate with a voltage of the intermediate current that is between 270 and 440 V, preferably between 290 and 430 V;

and/or a voltage of the output current that is between 20 and 550 V, preferably between 24 and 500 V, and/or a power of the output current that is between 500 and 6,000 W, preferably between 500 and 3,600 W.

According to one embodiment, the device is adapted to be mounted on the motorised device.

According to one embodiment, the device is adapted to be connected to the motorised device external to said device.

According to one embodiment, the motorised device is a vehicle, preferably an electrically powered motor vehicle.

A further object of the invention is a method for charging a battery of a motorised device, comprising:
- a first conversion of an alternating supply current into an intermediate current;
- a second conversion of the intermediate current into an output current;
- supplying the battery with the output current;

with the intermediate current being a direct current and the output current also being a direct current;

the method further comprising:
- adjusting the voltage of the intermediate current as a function of parameters of the second conversion.

According to one embodiment, the voltage of the intermediate current is adjusted as a function of the value of the voltage and/or of the power and/or of the intensity of the output current.

According to one embodiment, the second conversion is carried out by means of a conversion module comprising a resonant circuit having a resonance frequency, and preferably the voltage of the intermediate current is adjusted as a function of the resonance frequency.

According to one embodiment, the second conversion comprises an intermediate conversion of a direct current into an alternating current with a switching frequency.

According to one embodiment, the switching frequency is adjusted to a setpoint value.

According to one embodiment, the setpoint value of the switching frequency is equal to the resonance frequency or is greater than the resonance frequency and preferably equals 1.05 to 1.80 times the resonance frequency, and in a more particularly preferred manner equals 1.10 to 1.50 times the resonance frequency.

According to one embodiment, the voltage of the intermediate current is between 270 and 440 V, preferably between 290 and 430 V, and/or wherein the voltage of the output current is between 20 and 550 V, preferably between 24 and 500 V; and/or wherein the power of the output current is between 500 and 6,000 W, preferably between 500 and 3,600 W.

According to one embodiment, the motorised device is a vehicle, preferably an electrically powered motor vehicle.

The invention further relates to a motorised device comprising the charging device described above, as well as the battery.

According to one embodiment, this motorised device is a vehicle, and is preferably an electrically powered motor vehicle.

The present invention enables the disadvantages of the prior art to be overcome. More particularly, it provides a charging device for a motorised device (and for a vehicle in particular), with the performance of said charging device being improved.

This is accomplished by adjusting, during charging, the direct voltage delivered by the first AC-DC converter as a function of (effective) operating parameters of the second DC-DC converter. In effect, regardless of the type of DC-DC converter used, it has usage conditions that are optimal for its operation and that provide the best characteristics such as, for example, the output, the level of electromagnetic interference generated or any other performance condition that is desired in the application. These conditions are dependent on various parameters such as, for example the input voltage, the output voltage, the ratio of these two voltages, the transferred power.

The adjustment is accomplished as a function of either the output voltage or of the power, or of an internal parameter of the converter such as, for example, the switching frequency or the duty cycle or any other operating parameter.

By way of example, the voltage of the direct current delivered by the first AC-DC converter is adjusted as a function of the voltage and of the intensity of the output current delivered to the battery, and optionally as a function of the power of this current. In this way, the second DC-DC converter always operates in conditions that are close to predefined optimal operating conditions.

The advantage provided by the invention is particularly significant when the second DC-DC converter is a resonant converter (such as a converter comprising an LC or LLC series resonant circuit, for example), as in this case the output and the efficiency of the converter are highly dependent on the operating parameters of said second converter.

DESCRIPTION OF EMBODIMENTS OF THE INVENTION

The invention will now be described in further detail and in a non-limiting manner in the following description.

Figure 1:
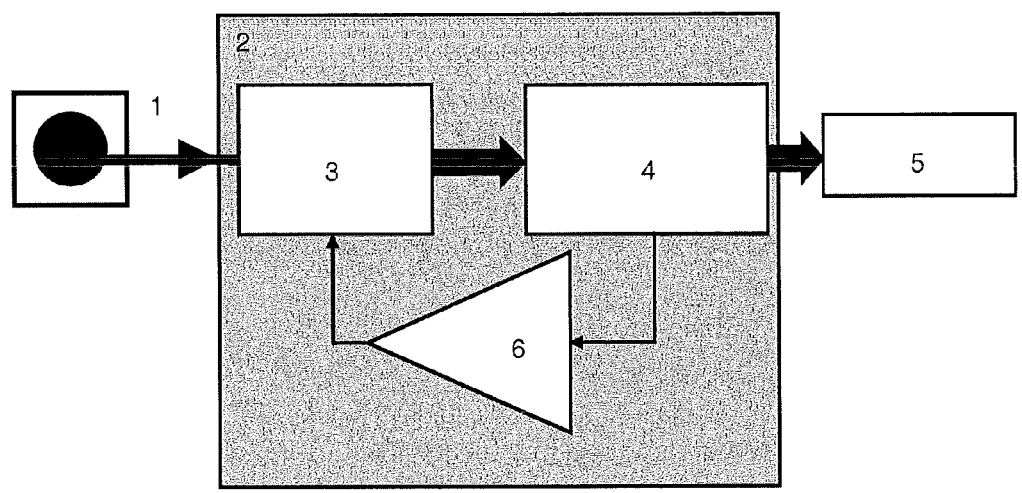
FIG. 1 schematically shows a charging device according to the invention operating in battery charging mode.

With reference to FIG. 1, a charging device 2 is designed to charge a battery 5 of a motorised device. This device can be either integrated inside the motorised device or in a charging system external to the motorised device or can also be independent. The battery 5 is adapted to deliver, and to be charged by, a direct current, referred to as output current, with a voltage, reference numeral $U_s$.

According to a preferred embodiment, the motorised device is an electrically powered vehicle, particularly a motor vehicle. In other embodiments, the motorised device can be handling equipment such as a forklift truck, an aerial work platform or a pallet truck.

The battery 5 represents the traction battery of the vehicle (or of the craft), i.e. the battery responsible for powering the motor of the vehicle (or of the craft). It is understood that this battery 5 can represent a single battery or a set of batteries.

The voltage $U_s$ is generally between 20 and 550 V, preferably between 24 and 500 V.

When charging the battery 5, the voltage $U_s$ can vary, for example, between extreme values of 300 V and 500 V.

The charging device 2 comprises a first conversion module 3 and a second conversion module 4. According to one embodiment, the charging device of the invention comprises a housing, in which the first conversion module 3 and the second conversion module 4 (and possibly the control means 6 described hereafter) are arranged. This housing can be integrated or on board the motorised device or vehicle or can also be disposed in an external system, for example a vehicle charging terminal.

The first conversion module 3 is adapted to convert an alternating power supply current (input current) into a direct current, referred to as intermediate current and having a voltage, reference $U_i$. In charging mode, a power supply source 1 (such as the electricity network) supplies the first conversion module 3 with alternating current.

The input current can be either single-phase, for example with a voltage of 85 to 265 V, or two-phase, for example with a voltage of 200 to 250 V, or multi-phase, and particularly three-phase, for example with a voltage of 380 to 420 V. The first conversion module 3 supplies the second conversion module 4 with direct current of voltage $U_i$.

The second conversion module 4 is adapted to convert the intermediate direct current of voltage $U_i$ into direct output current of voltage $U_s$, which supplies the battery.

The first conversion module 3 preferably comprises a power correction circuit in order to limit the input current harmonics. Such a circuit also has the advantage of operating on a wide range of input voltages.

Figure 3:
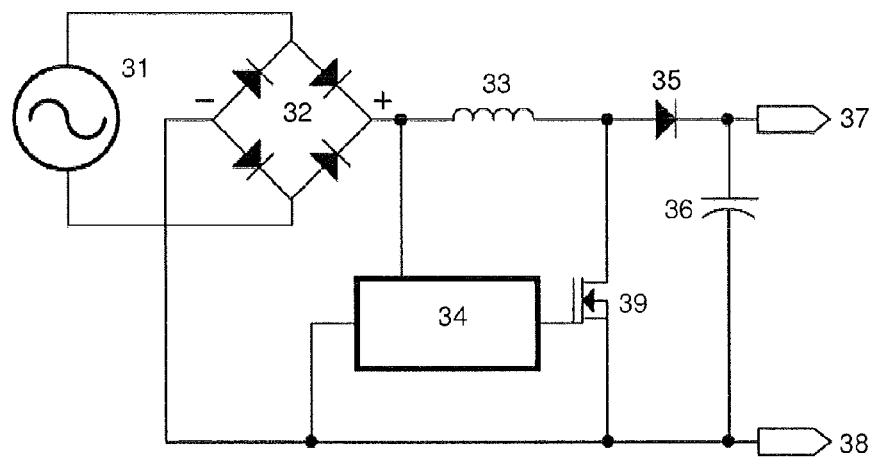
FIG. 3 is a functional diagram of the electrical circuit of an AC-DC converter used within the scope of the invention, according to one embodiment.

With reference to FIG. 3, which represents, for example, the functional diagram of a single-phase sinusoidal absorption boost converter (PFC), the converter 3 accepts a universal alternating input voltage, for example between 80 and 265 V and delivers a direct output voltage, for example 400 V.

In the example shown, the power supply source 31 is connected to a power factor correction circuit, which is single-phase in the example, composed of a diode bridge 32, an inductor 33, a control and regulation circuit 34, a controlled switch 39, in this case represented by an insulated gate field effect transistor (MOSFET), a rectification diode 35 and a filtering capacitor 36. The current referred to as intermediate current in the preceding description is obtained at the terminals 37, 38 of the circuit. This circuit acts as a pre-regulator, the input current of which is the same form as the form of the voltage of the input current. In the case of a sinusoidal power supply, the absorbed current is sinusoidal and the output is a direct voltage current.

Figure 2:
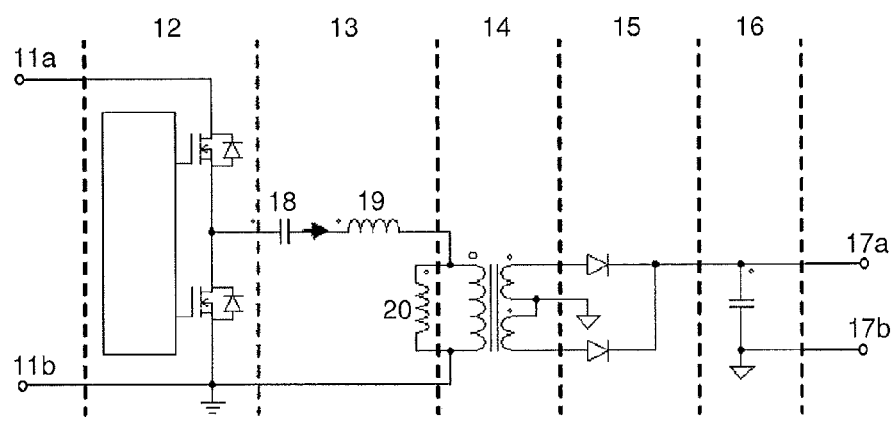
FIG. 2 is a functional diagram of the electrical circuit of a DC-DC converter used within the scope of the invention, according to one embodiment.

With reference to FIG. 2, the second conversion module 4 comprises input terminals 11a, 11b designed to receive the voltage current $U_i$ coming from the first conversion module 3. The direct current of voltage $U_s$ is delivered to the output terminals 17a, 17b.

The second conversion module 4 is preferably a switching conversion module comprising galvanic isolation, i.e. it comprises: a switching sub-module 12 converting the intermediate direct current into alternating current, the frequency of which is referred to as switching frequency, a transformation sub-module 14 receiving said alternating current, comprising a magnetic coupling of two circuits and providing the galvanic isolation, and a rectification sub-module 15 converting the alternating current coming from the transformation sub-module into the direct output current.

Also preferably, the second conversion module 4 is a resonant converter. A resonant converter is a converter for which there is at least one given resonance frequency, with the switching conditions of the switching circuit being optimal when the switching frequency is equal to the resonance frequency.

This resonant circuit, subject to the switching frequency being close to the resonance frequency, allows high output operation.

In the example shown, the second conversion module 4 is both a conversion module with switching comprising galvanic isolation and a resonant converter.

More specifically, the switching sub-module 12 is connected to the input terminals 11a, 11b. The alternating current produced by the switching sub-module 12 typically has a square form. It can be produced by means of switching elements. It is possible to use, for example, a half-bridge or a full-bridge by way of a switching sub-module 12.

A resonant circuit 13 is connected to the switching sub-module 12. In this case this involves a circuit of the LLC type i.e. comprising a capacitor 18, a first inductor 19 and a second inductor 20 in series. Nevertheless, it is also possible to use, for example, a circuit of the LC type comprising a capacitor and a single inductor.

The transformation sub-module 14 is connected to the resonant circuit 13, in the example shown it is connected to the terminals of the second inductor 20.

The resonant circuit 13 comprises at least one resonance frequency. An LLC circuit, for example, comprises two resonance frequencies, with the resonance frequency of interest for the requirements of the invention being the higher of the two. This frequency is determined by the capacitance and inductance values of the capacitors and inductors present in the circuit.

In the example shown, if Lr represents the inductance value of the first inductor 19 and Cr represents the capacitance of the capacitor 18, this resonance frequency equals:

$$F_r = \frac{1}{2\Pi\sqrt{Lr \cdot Cr}}$$

The rectification sub-module 15 is connected to the terminals of the transformation sub-module 14. The rectification sub-module 15 typically comprises a set of diodes or insulated gate field effect transistors (MOSFET) in the case of synchronous rectification or any other component with equivalent functions.

A filtration sub-module 16 can be provided at the output of the rectification sub-module 15. This filtration sub-module 16 can, for example, comprise a low-pass filter comprising a capacitor.

The output terminals 17a, 17b of the second conversion module 4 are connected to the filtration sub-module 16.

As a variant, the resonant circuit 13 described above can be replaced by any type of galvanic isolation circuit (for example, a converter with direct transfer comprising duty cycle modulation ("forward", "push pull", "series chopper", etc.) or with phase-shift modulation.

Optimal operating conditions can be defined for each given second conversion module 4.

Therefore, the invention provides control in the form of means 6 for controlling the first conversion module 3, which means are adapted to adjust the voltage $U_i$ of the intermediate current according to the evolution of the charge of the battery 5, so that the second conversion module 4 operates in the predefined optimal conditions practically throughout the charging period.

This closed-loop control can be carried out in several ways, either by a variation rule established as a function of the measured voltage and current conditions or on the basis of the measurement or of the direct control of the operation of the converter 4.

In the example of a converter of the resonant type, this generally mainly involves maintaining the switching frequency close to the resonance frequency of the converter.

More specifically, in the case of variation in the voltage $U_s$ and/or in the power of the output current due to the charge (battery 5), a control allows the frequency and/or the switching duty cycle of the second conversion module 4 to be modified so as to adapt the DC-DC conversion to the new conditions imposed by the charge.

This control tends to detract from the optimal operating conditions of the second conversion module 4. Consequently, a second closed-loop control is provided on the first conversion module 3 so as to modify the value of the voltage $U_i$ of the intermediate current. The switching frequency therefore can be returned to its setpoint value so that the second conversion module 4 returns to its predefined optimal operating conditions.

In the case of a converter 4 of the resonant type, the setpoint value of the switching frequency particularly can be equal to the resonance frequency. In effect, the output is maximal and the electromagnetic interference is minimal when the switching frequency is equal to the resonance frequency.

Alternatively, it is possible to choose to adjust the switching frequency to a distinct frequency value of the resonance frequency, and which in particular is higher than the resonance frequency but is close to said frequency.

Figure 6:
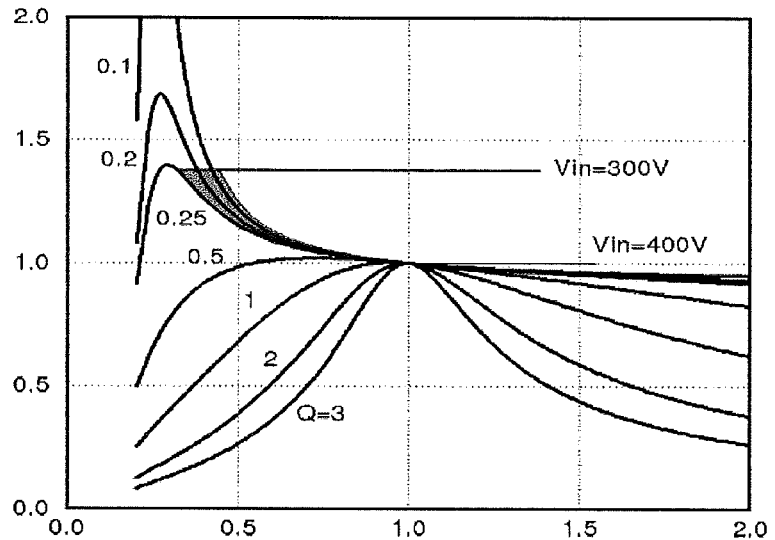
FIG. 6 is a curve showing the gain (on the ordinate) as a function of the ratio between the switching frequency and the resonance frequency (on the abscissa) for different quality coefficients, reference Q, for the DC-DC converter shown in FIG. 2.

In the case of the LLC resonant circuit 13 shown with reference to the example of FIG. 6, which shows the voltage gain as a function of the switching frequency Fs normalised relative to the resonance frequency Fr, it can be seen that when the quality coefficient Q equals 3, the gain shows a maximum when Fs/Fr=1. It is therefore advantageous to set the setpoint of the switching frequency to a value of approximately 15% to 20% higher than the value of the resonance frequency, in a zone where the gain varies in a monotone manner as a function of the switching frequency.

Figure 4:
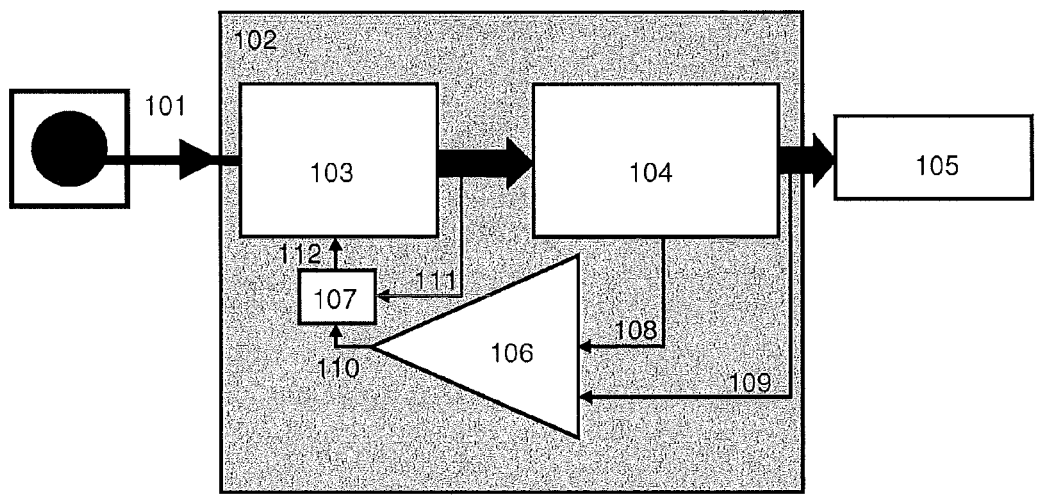
FIG. 4 schematically shows an embodiment of a charging device according to the invention, operating in battery charging mode.

FIG. 4 shows a particular embodiment of the charging device as generally described above with reference to FIG. 1. According to this particular embodiment, the charging device 102 further comprises a first conversion module 103 and a second conversion module 104 and it is designed to charge a battery 105 from a power supply source 101, as described above. It further comprises means 106, 107 for controlling the first conversion module 103, which means, according to this particular embodiment, comprise a measuring module 106 and a control module 107.

The measuring module 106 comprises, for example, an input 108 capable of receiving information relating to the switching frequency of the second conversion module 104, as well as an input 109 capable of receiving at least one item of information relating to the output current (the current delivered by the second conversion module 104). For example, the input 109 can be capable of receiving information relating to the voltage, to the intensity and/or to the power of the output current.

A transmission line 110 is also provided between the measuring module 106 and the control module 107. The control module 107 further comprises an input 111 capable of receiving an item of information relating to the voltage of the intermediate current (voltage $U_i$). Finally, the control module 107 comprises a control output 112 capable of modifying the operation of the first conversion module 103.

The particular embodiment discussed above allows the voltage of the intermediate current supplying the second conversion module 104 to be modulated as a function of one or more items of information selected, for example, from the voltage values of the output current, from the intensity of the output current, from the power of the output current, from the switching frequency of the second conversion module and from the voltage of the intermediate current.

Figure 5:
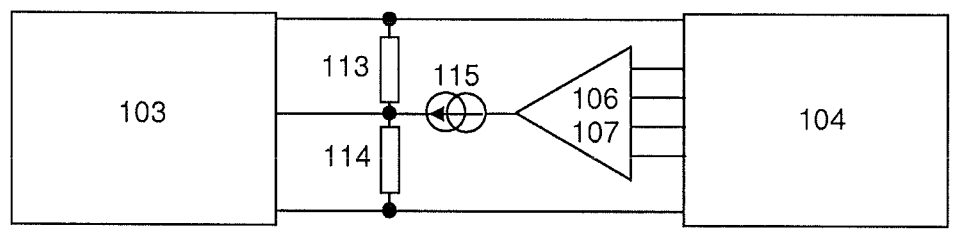
FIG. 5 schematically shows an electric circuit allowing the voltage of the intermediate current to be controlled, according to one embodiment of the invention.

With reference to FIG. 5, an illustrative example of a means for adjusting the voltage of the intermediate current will now be described.

In this illustrative example, the first conversion module 103 comprises a device for measuring the voltage of the current delivered by said module (voltage reference $U_i$ above). This device comprises, for example, a voltage division circuit comprising two resistors 113, 114. The control means 106, 107 of the first conversion module 103 in turn comprise a current setpoint generator 115 that is connected to the terminals of one of the resistors 113, 114. In this way, the control means 106, 107 modulate the measurement of the voltage of the intermediate current by the first conversion module 13 via the setpoint current generator 115.

By way of example, a digital controller can be used with respective measurements of the switching frequency, of the intensity of the output current, of the voltage of the output current, of the voltage of the intermediate current, so as to generate a setpoint current that is delivered to the device for measuring the voltage of the current by the first conversion module 103, thus producing the desired optimisation.

The invention claimed is:

1. A charging device (2) for a battery (5) of a motorised device, said charging device (2) being adapted to be mounted on the motorised device or to be connected to the motorised device external to said device, and comprising:
   a first conversion module (3);
   a second conversion module (4), comprising a resonant circuit (13) having at least one resonance frequency;
   a controller (6) for controlling the first conversion module (3),
   the first conversion module (3) being adapted to convert an input alternating current into an intermediate current and to supply the second conversion module (4) with said intermediate current;
   the second conversion module (4) being adapted to convert the intermediate current into an output current and to supply the battery (5) with said output current;
   the intermediate current being a direct current and the output current also being a direct current;
   the controller (6) being adapted to adjust the voltage of the intermediate current as a function of operating parameters of the second conversion module (4).

2. The device according to claim 1, wherein the controller (6) is adapted to adjust the voltage of the intermediate current as a function of the voltage and/or of the power and/or of the intensity of the output current.

3. The device according to claim 1, wherein the second conversion module (4) is a switching conversion module comprising galvanic isolation, operating at a switching frequency.

4. The device according to claim 1, wherein the second conversion module (4) comprises a switching sub-module (12), associated with the resonant circuit (13), adapted to convert the intermediate current into a first alternating current with a switching frequency; a transformation sub-module (14) adapted to convert the first alternating current into a second alternating current; a rectification sub-module (15) adapted to convert the second alternating current into the output current.

5. The device according to claim 1, wherein the resonant circuit (13) is a circuit of the LC type or of the LLC type comprising at least one capacitor (18) and at least one inductor (19, 20).

6. The device according to claim 4, wherein the controller (6) is adapted to adjust the voltage of the intermediate current so that the switching frequency can be adjusted to a setpoint value.

7. The device according to claim 6, wherein the setpoint value of the switching frequency is equal to the resonance frequency or is greater than the resonance frequency.

8. The device according to claim 1, wherein the first conversion module (3) comprises a power factor correction circuit.

9. The device according to claim 1, wherein the first conversion module (3) comprises a device for measuring the voltage of the intermediate current and a device for adjusting said voltage to a setpoint voltage, and
    wherein the controller (6) is adapted to modulate the device for measuring the voltage of the intermediate current.

10. The device according to claim 1, wherein the controller (6) is a digital controller of the first conversion module (3).

11. The device according to claim 1, adapted to operate with a voltage of the intermediate current that is between 270 and 440 V; and/or a voltage of the output current that is between 20 and 550 V and/or a power of the output current that is between 500 and 6,000 W.

12. The device according to claim 1, wherein the motorised device is an electrically powered motor vehicle.

13. A method for charging a battery of a motorised device, comprising:
    a first conversion of an alternating supply current into an intermediate current;
    a second conversion of the intermediate current into an output current in a conversion module comprising a resonant circuit having a resonance frequency;
    supplying the battery with the output current;
    with the intermediate current being a direct current and the output current also being a direct current;
    the method further comprising:
        adjusting the voltage of the intermediate current as a function of parameters of the second conversion;
    the method being implemented either inside or outside of said motorised device.

14. The method according to claim 13, wherein the voltage of the intermediate current is adjusted as a function of the value of the voltage and/or of the power and/or of the intensity of the output current.

15. The method according to claim 13, wherein the voltage of the intermediate current is adjusted as a function of the resonance frequency.

16. The method according to claim 13, wherein the second conversion comprises an intermediate conversion of a direct current into an alternating current with a switching frequency.

17. The method according to claim 16, wherein the switching frequency is adjusted to a setpoint value.

18. The method according to claim 17, wherein the setpoint value of the switching frequency is equal to the resonance frequency or is greater than the resonance frequency.

19. The method according to claim 13, wherein the voltage of the intermediate current is between 270 and 440 V, and/or wherein the voltage of the output current is between 20 and 550 V and/or wherein the power of the output current is between 500 and 6,000 W.

20. The method according to claim 13, wherein the motorised device is electrically powered motor vehicle.

21. A motorized device (8) comprising the charging device (2) according to claim 1, as well as the battery (5).

22. The motorized device (8) according to claim 21, which device is an electrically powered motor vehicle.

\* \* \* \* \*